United States Patent
McLaughlin et al.

(10) Patent No.: US 11,418,573 B1
(45) Date of Patent: *Aug. 16, 2022

(54) FILE TRANSFER ABSTRACTION ON A COMPUTER NETWORK

(71) Applicant: Wells Fargo Bank, N.A., San Francisco, CA (US)

(72) Inventors: Thomas McLaughlin, Garnet Valley, PA (US); Charles Eric Almond, Charlotte, NC (US); James Ian Percival, Clyde, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/365,946

(22) Filed: Jul. 1, 2021

Related U.S. Application Data

(63) Continuation of application No. 15/945,205, filed on Apr. 4, 2018, now Pat. No. 11,057,455.

(51) Int. Cl.
  *H04L 67/06* (2022.01)
  *H04L 41/22* (2022.01)
  *G06F 16/182* (2019.01)

(52) U.S. Cl.
  CPC ............ *H04L 67/06* (2013.01); *G06F 16/183* (2019.01); *H04L 41/22* (2013.01)

(58) Field of Classification Search
  None
  See application file for complete search history.

(56) References Cited

U.S. PATENT DOCUMENTS

| | | | | |
|---|---|---|---|---|
| 7,822,837 | B1 * | 10/2010 | Urban | H04L 43/00 709/223 |
| 7,891,001 | B1 * | 2/2011 | Greenawalt | H04L 63/20 713/153 |
| 11,057,455 | B1 * | 7/2021 | McLaughlin | H04L 41/0806 |
| 2003/0117978 | A1 * | 6/2003 | Haddad | H04L 67/14 370/331 |
| 2007/0004393 | A1 * | 1/2007 | Forsberg | H04W 4/50 455/420 |

(Continued)

OTHER PUBLICATIONS

Woodie, "Managed File Transfer: A New Product Category That's Here to Stay," Four Hundred Stuff, vol. 9, No. 32, Sep. 1, 2009, 4 pp.

(Continued)

*Primary Examiner* — Backhean Tiv
(74) *Attorney, Agent, or Firm* — Shumaker & Sieffert, P.A.

(57) ABSTRACT

This disclosure describes techniques for providing an abstraction layer for one or more file transfer tools that may operate on a public network, or on a network controlled by an organization or enterprise. In some examples, a computing system may serve as a front-end for a managed file transfer system that may hide some details of the operations performed by the file transfer system. The computing system may interact with one or more managed file transfer systems (or similar systems) to provision a data path between computing systems, perform a file transfer between the computing systems, perform sustainment tasks associated with the data path, and/or perform lifecycle management tasks associated with the data path.

20 Claims, 4 Drawing Sheets

(56) References Cited

U.S. PATENT DOCUMENTS

| | | | |
|---|---|---|---|
| 2012/0102543 A1* | 4/2012 | Kohli | H04L 63/20 |
| | | | 726/1 |
| 2013/0346522 A1* | 12/2013 | Lennstrom | H04L 51/08 |
| | | | 709/206 |
| 2015/0242643 A1* | 8/2015 | Hankins, Jr. | H04L 63/0428 |
| | | | 726/26 |
| 2015/0264019 A1* | 9/2015 | Carroll | H04L 67/10 |
| | | | 726/26 |
| 2015/0301839 A1* | 10/2015 | Bansal | H04L 41/0806 |
| | | | 709/222 |
| 2017/0269954 A1 | 9/2017 | Hardy | |
| 2018/0137295 A1* | 5/2018 | Sharma | H04L 63/0428 |
| 2019/0020709 A1* | 1/2019 | Kurian | H04L 67/06 |
| 2019/0289061 A1* | 9/2019 | Theroux | H04L 67/06 |
| 2019/0332494 A1* | 10/2019 | Natanzon | G06F 9/54 |

OTHER PUBLICATIONS

"Axway's MFT Gateway: Secure Transport," Axway, accessed from https://www.axway.com/en/enterprise-solutions/secure-transport#tablist1-tab1, believed to be available prior to Apr. 2018, accessed on Jul. 17, 2018, 3 pp.

Prosecution History from U.S. Appl. No. 15/945,205, dated Mar. 24, 2020 through Mar. 10, 2021, 95 pp.

\* cited by examiner

FIG. 3

Data Transmission Services Portal ▼

Home
File Transfer Request
Request History

Source and Destination Configuration

| | Source | Destination |
|---|---|---|
| Unique ID: | 12345 | 67890 |
| Customer ID: | 234554 | 546763 |
| Account Name: | AbcBlue | XyzRed |
| Client Org.: | Abc Bank | Xyz Bank |
| Contact Name: | James Smith | Jane Doe |
| Contact Phone: | 415-123-4567 | 212-123-4567 |
| Contact Email: | james@abc.com | jane@xyz.com |
| Initiated By: | Remote System | Remote System |
| Protocol: | FTPS | FTPS |
| Customer Type: | Partner | Partner |
| Filename: | \\abc\a\Alpha.txt | |

[SUBMIT]

FILE TRANSFER ABSTRACTION ON A COMPUTER NETWORK

CROSS REFERENCE

This application is a continuation application of and claims priority to U.S. patent application Ser. No. 15/945,205 filed on Apr. 4, 2018, which is hereby incorporated by reference herein in its entirety.

TECHNICAL FIELD

This disclosure relates to computer networks, and more specifically, to performing file transfers on a network.

BACKGROUND

Enterprise networks commonly transfer, at the direction of users, files into and out of the enterprise network. Operational risk often accompanies such transfers, since network and/or data security may be compromised during or as a result of file transfers. Various enterprise network tools are sometimes used to manage the secure transfer of files. Such tools may not only enable secure transfer of files between computers within an enterprise, but also enable file transfers involving computing systems outside an enterprise firewall. Managed file transfer (MFT) systems, for example, perform file transfers between people, sites, applications, and external partners. In some cases, a managed file transfer system may provide reporting and auditability features.

SUMMARY

Aspects of this disclosure describe techniques for providing an abstraction layer for one or more file transfer tools, managed file transfer systems, or similar systems that may operate on a public network, or on a network controlled by an organization or enterprise. In some examples, such techniques may involve providing a front-end for a managed file transfer system that may hide some details of the operations performed by the file transfer system. A computing system may interact with one or more file transfer tools to provision a channel or data path between computing systems, perform a file transfer between the computing systems, and perform sustainment and/or maintenance tasks associated with the provisioned data path. In some examples, such sustainment tasks may include lifecycle management tasks associated with the channel or data path. Techniques in accordance with one or more aspects of the present disclosure may enable an enterprise or other network to operate more reliably, more consistently, with less susceptibility to human error, and with less exposure to operational risk.

In one example, this disclosure describes a method comprising: outputting, by a computing system, a unified user interface for transferring files on a network using at least one of a plurality of file transfer tools, wherein the unified user interface includes prompts for information sufficient to transfer files using at least one of the plurality of file transfer tools; receiving, responsive to interactions with the unified user interface, a request to transfer a specified file on the network; identifying a file transfer tool appropriate for transferring the specified file; provisioning, based on identifying the file transfer tool, a data path on the network that the file transfer tool can use to transfer the specified file; enabling the file transfer tool to transfer the specified file over the data path; and automatically performing sustainment operations for maintaining the data path.

In another example, this disclosure describes a computing system comprising a storage system and processing circuitry, wherein the processing circuitry has access to the storage system and is configured to: output a unified user interface for transferring files on a network using at least one of a plurality of file transfer tools, wherein the unified user interface includes prompts for information sufficient to transfer files using at least one of the plurality of file transfer tools; receive, responsive to interactions with the unified user interface, a request to transfer a specified file on the network; identify a file transfer tool appropriate for transferring the specified file; provision, based on identifying the file transfer tool, a data path on the network that the file transfer tool can use to transfer the specified file; enable the file transfer tool to transfer the specified file over the data path; and automatically perform sustainment operations for maintaining the data path.

In another example, this disclosure describes a computer-readable storage medium comprises instructions that, when executed, configure processing circuitry of a computing system to: output a unified user interface for transferring files on a network using at least one of a plurality of file transfer tools, wherein the unified user interface includes prompts for information sufficient to transfer files using at least one of the plurality of file transfer tools; receive, responsive to interactions with the unified user interface, a request to transfer a specified file on the network; identify a file transfer tool appropriate for transferring the specified file; provision, based on identifying the file transfer tool, a data path on the network that the file transfer tool can use to transfer the specified file; enable the file transfer tool to transfer the specified file over the data path; and automatically perform sustainment operations for maintaining the data path.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

FIG. 3 is a conceptual diagram illustrating an example user interface, presented by a client computing device, for initiating a file transfer in accordance with one or more aspects of the present disclosure.

DETAILED DESCRIPTION

Figure 1:
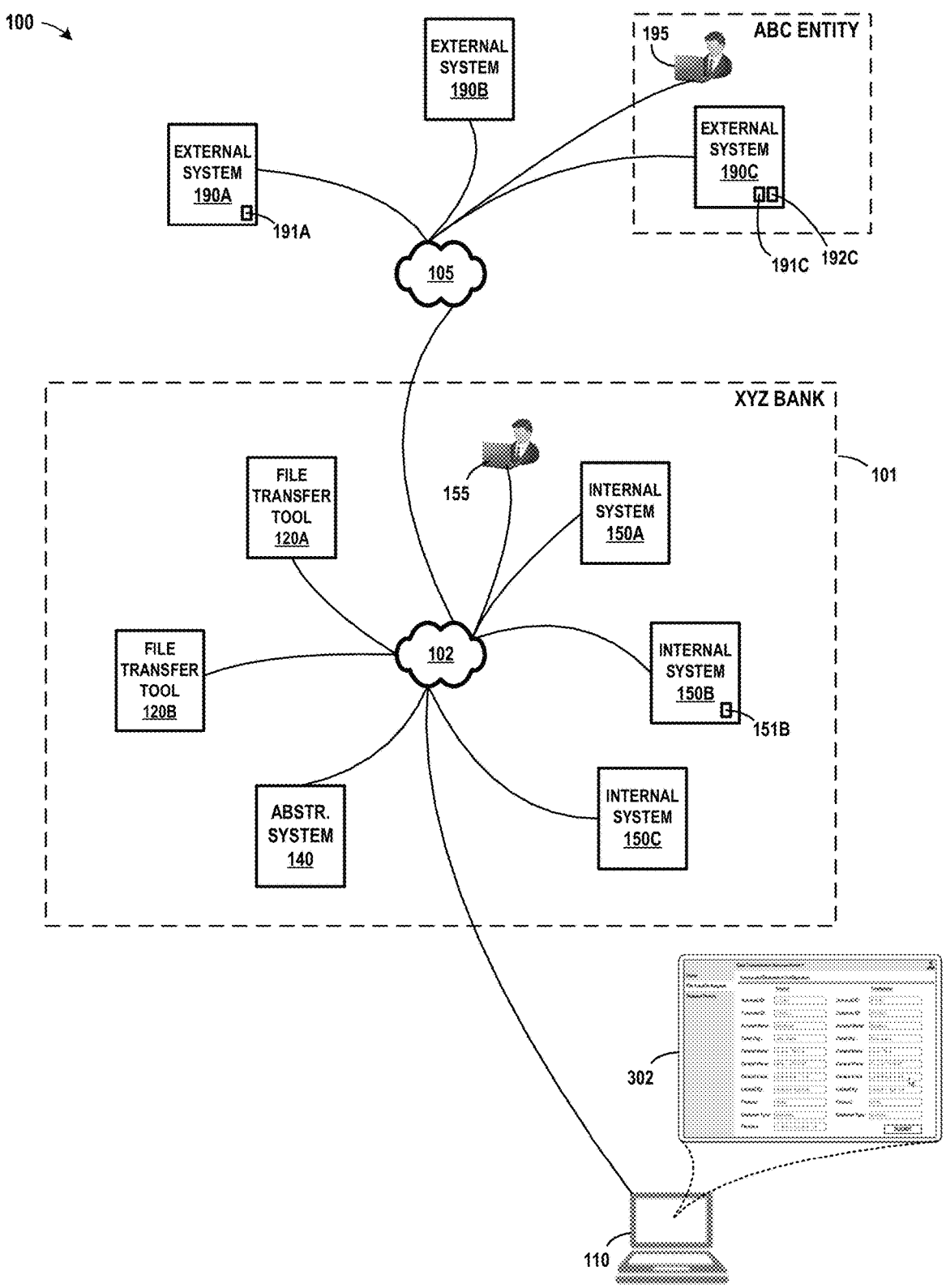
FIG. 1 is a conceptual diagram illustrating an example system for providing an abstraction layer for one or more file transfer tools, in accordance with one or more aspects of the present disclosure.

FIG. 1 is a conceptual diagram illustrating an example system for providing an abstraction layer for one or more file transfer tools, in accordance with one or more aspects of the present disclosure. The example system 100 illustrated in FIG. 1 includes a number of computing systems connected via network 102 and network 105. Enterprise network 101 may represent a collection of computing devices managed or administered by an organization or corporate entity, such as XYZ Bank. In particular, enterprise network 101 may include internal computing systems 150A through 150C (collectively "computing systems 150"), file transfer tools 120A and 120B (collectively "file transfer tools 120"), and one or more abstraction computing systems 140. Computing systems 150 may each represent any appropriate computing system that may reside within enterprise network 101, such as an application server, information server, or other system. In some examples, one or more computing systems 150 may interact with one or more client computing systems 110 to perform tasks, services, and/or other functions on behalf of client computing systems 110 or other systems within enterprise network 101. One or more client computing systems 110 may be included within enterprise network 101 or may be a remote system having access to one or more systems within enterprise network 101. Aspects of enterprise network 101 may be administered, controlled, and/or monitored by an administrator or agent of XYZ Bank operating one or more workstations 155.

One or more of the systems within enterprise network 101 may communicate with each other over network 102, and may communicate with external computing system 190A through 190C (collectively "external computing systems 190") over network 105. Each of external computing systems 190 may be associated with a different organization or entity. One or more of external computing systems 190 may also represent a publicly available computing system, such as a web site, application server, file transfer server, or other similar system. External computing system 190C, for example, may be owned and/or controlled by ABC Entity, which may be an entity that is different than XYZ Bank, but may have a partnership or other business relationship with XYZ Bank. For example, if XYZ Bank is a financial institution, ABC Entity may be another financial institution (e.g., a rival bank). In other examples, ABC Entity may be in a different line of business than XYZ Bank (e.g., a credit reporting agency, or another type of information or service provider). Workstation 195 may be operated by an agent or employee of ABC Entity, and may be responsible for aspects of the operation of external computing system 190C.

Each of external computing systems 190, workstation 195, computing systems 150, workstation 155, file transfer tools 120, and computing systems 140 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, one or more of such systems may represent a cloud computing system, server farm, and/or server cluster (or portion thereof) that provides services to client devices and other devices or systems. In other examples, one or more of such systems may represent or be implemented through one or more virtualized compute instances (e.g., virtual machines, containers) of a data center, cloud computing system, server farm, and/or server cluster.

For ease of illustration, a limited number of external computing systems 190, workstation 195, computing systems 150, workstation 155, file transfer tools 120, client computing systems 110, and computing system 140 are shown within FIG. 1 and/or in other illustrations referenced herein. However, techniques in accordance with one or more aspects of the present disclosure may be performed with many more of such systems, and collective references to components, devices, modules, and/or systems may represent references to any number of such components, devices, modules, and/or systems.

File transfer tools 120, shown within enterprise network 101, may each represent a computing system, tool, channel, gateway, and/or service for transferring a file within enterprise network 101 and/or between enterprise network 101 and one or more of external computing systems 190. For instance, one or more of file transfer tools 120 may be a system for managing SFTP (Secure File Transfer Protocol) file transfers. In another example, one or more of file transfer tools 120 may be a file transfer platform, often provided by a third party, that is capable of managing file transfers involving a variety of protocols. Such file transfer platforms may include a managed file transfer (MFT) tool or solution, such as the Axway SecureTransport multi-protocol MFT solution available from Axway Inc., IBM's Managed File Transfer suite of products, or Coviant Software's Diplomat MFT solution. In some examples, one or more of file transfer tools 120 may serve as a gateway for securing, managing, and tracking file flows between systems, applications, and people both inside enterprise network 101 and between enterprise network 101 and systems, applications, and people external to enterprise network 101.

In general, each of file transfer tools 120 may be any solution or collection of technologies, channels, protocols, and/or systems that enable file transfers. One or more file transfer tools 120 may be capable of being controlled by another computing system, and may expose an API or may provide some other programmatic method for enabling such control (e.g., a batch feed, command line interfaces, or a database interface, such as ODBC or JDBC). Although for ease of illustration, file transfer tools 120 are shown within FIG. 1 as separate systems, one or more of file transfer tools 120 may be implemented as part of another systems included within FIG. 1 (e.g., one or more of computing systems 150 or external computing systems 190). Further, one or more of file transfer tools 120 may be implemented as a hardware and/or software module executing on one or more systems (computing systems 150) included within FIG. 1.

Abstraction computing system 140 may represent a system that provides services that include providing an abstraction layer for one or more file transfer tools 120, in accordance with one or more aspects of the present disclosure. In some examples, computing system 140 may perform file transfer services on behalf of a user of client computing system 110, and may perform various tasks associated with such a file transfer by interacting with one or more file transfer tools 120 on behalf of the user of client computing system 110. Alternatively or in addition, computing system 140 may provide a user interface or conceptual front-end for file transfer tools 120.

Client computing system 110 may be implemented as any suitable computing system, such as a mobile, non-mobile, wearable, and/or non-wearable computing device. Client computing system 110 may, in some examples, represent a smart phone, a tablet computer, a computerized watch, a personal digital assistant, a virtual assistant, a gaming system, a media player, an e-book reader, a television or television platform, an automobile, or navigation, information and/or entertainment system for an automobile or other vehicle, a laptop or notebook computer, a desktop computer, or any other type of wearable, non-wearable, mobile, or non-mobile computing device that may perform operations in accordance with one or more aspects of the present disclosure.

Network 105 may be the internet or may include or represent any public or private communications network or other network. For instance, network 105 may be a cellular, Wi-Fi®, ZigBee, Bluetooth, Near-Field Communication (NFC), satellite, enterprise, service provider, and/or other type of network enabling transfer of transmitting data between computing systems, servers, and computing devices. One or more of client devices, server devices, or other devices may transmit and receive data, commands, control signals, and/or other information across network 105 using any suitable communication techniques. Network 105 may include one or more network hubs, network switches, network routers, satellite dishes, or any other network equipment. Such devices or components may be operatively inter-coupled, thereby providing for the exchange of information between computers, devices, or other components (e.g., between one or more client devices or systems and one or more server devices or systems). Each of the devices or systems illustrated in FIG. 1 may be operatively coupled to network 105 using one or more network links. The links coupling such devices or systems to network 105 may be Ethernet, Asynchronous Transfer Mode (ATM) or other types of network connections, and such connections may be wireless and/or wired connections. One or more of the devices or systems illustrated in FIG. 1 or otherwise on network 105 may be in a remote location relative to one or more other illustrated devices or systems.

Similarly, network 102 may be a network enabling transfer of transmitting data between computing systems, servers, and computing devices within enterprise network 101 and operated, administered, or otherwise under control of an organization, such as an enterprise, business, or corporation (i.e., XYZ Bank in the example of FIG. 1). In some examples, network 102 may be separated from network 105 by a firewall or other device or system, and capable of communicating with network 105 and/or device and systems connected with network 105 pursuant to certain constraints. Network 102 may be implemented in a manner similar to network 105, and thus may include one or more network hubs, network switches, network routers, or any other network equipment.

Transferring files into and out of an enterprise network is a common operation supported by nearly every enterprise network. When a file transfer is performed in an enterprise environment, particularly in large regulated enterprise environments, it is often desirable and/or necessary to also carry out additional or supplemental tasks in connection with such a file transfer. For example, various compliance and/or regulatory concerns may require certain tasks be performed in connection with a file transfer, such as those relating to reporting, privacy preservation, recordkeeping, security practices, transparency and visibility, as well as sustainment tasks relating to maintaining the data path, connection, or channel, such as performance metrics collection, performance monitoring, audit trail creation, data preservation, and others. In some examples, further tasks relating to life cycle management of the data path may also be performed.

Accordingly, for a user that seeks to transfer a file, and in order to support such functions and/or tasks, a significant amount of information may be required of that user, much of which may be necessary for performing the supplemental tasks typically carried out in connection with the file transfer. To manage such requirements and additional tasks, one or more file transfer tools 120 are typically used. In some cases, some of file transfer tools 120 may be relatively primitive in nature, but may be appropriate for performing part of the set of tasks associated with transferring a particular file. In other cases, one or more file transfer tools 120 may be relatively sophisticated, and may provide a higher level of security and control than using lower-level file transfer techniques, such as FTPS and HTTPS. In general, however, properly configuring and/or provisioning each of the set of technologies, interfaces, protocols, and standards associated with each of file transfer tools 120 may require different procedures or may involve navigating different user interfaces or models of the file transfer procedure. The disparate technologies, connections, channels, and other characteristics associated with transferring a file in a large enterprise network tends to significantly complicate the task of choosing, provisioning, and using one or more of a wide variety of available file transfer tools 120.

For example, in the system illustrated in FIG. 1, file transfer tool 120A may perform a managed file transfer in response to user input. In such an example, client computing system 110 detects input and outputs a signal over network 102. File transfer tool 120A detects a signal over network 102 and determines that the signal corresponds a request, by a user operating client computing system 110, to transfer file 191A at external computing system 190A to computing system 150A. In response, file transfer tool 120A outputs a series of signals over network 102. Client computing system 110 receives the signals and outputs a series of user interfaces, prompting a user of client computing system 110 for a variety of information. Client computing system 110 and file transfer tool 120A further communicate over network 102, and file transfer tool 120A collects, based on input detected at client computing system 110, information about transferring file 191A to computing system 150A. Eventually, file transfer tool 120A transfers, in response to the collected information, file 191A from external computing system 190A to computing system 150A. File transfer tool 120A may also perform a variety of supplemental tasks, before or after transferring the file, associated with the file transfer. In some examples, such tasks may include tasks relating to provisioning the channel or data path over which the file is transferred and performing sustainment operations relating to helping to ensure that the provisioned channel or data path may be used again.

In another example, file transfer tool 120B, which may be a different type of tool and/or use a different set of channels, technologies, and/or configuration procedures, may also perform a managed file transfer in response to user input. For instance, still referring to the example of FIG. 1, client computing system 110 detects input and outputs a signal over network 102. File transfer tool 120B detects a signal over network 102 and determines that the signal corresponds a request, by a user operating client computing system 110, to transfer file 151B at computing system 150B to external computing system 190B. In response, file transfer tool 120B outputs a series of signals over network 102. Client computing system 110 receives the signals and outputs a series of user interfaces, prompting the user of client computing system 110 for a variety of information. Eventually, file transfer tool 120B collects sufficient information to transfer file 151B, and file transfer tool 120B then transfers file 151B, and also performs any appropriate supplemental tasks (e.g., those relating to provisioning, sustainment, and/or lifecycle management).

The information required of a user to perform the file transfer involving file 151B may be significantly different than the information required to perform a file transfer involving file 191A. For example, in the examples described, file 151B is transferred by file transfer tool 120B, which may be a different type of system than file transfer tool 120A. In some examples, file transfer tool 120A may be a managed file transfer system, and file transfer tool 120B may be a system for performing managed secure file transfer operations, or a managed file system developed by another vendor. The procedures for using each such system may be significantly different, and accordingly, file transfer tool 120B may cause a set of user interfaces to be presented to a user of client computing system 110 that are significantly different than the user interfaces presented to the user when file transfer tool 120A is involved. Further, since file 151B is stored on computing system 150B, rather than on external computing system 190A, a different set of compliance and/or regulatory rules may apply, and the information required of the user of client computing system 110 may also be different for that reason, and in some cases, significantly different. Still further, a variety of underlying processes, technology, protocols, and systems may be involved in any type of file transfer, and when those file transfers differ in even subtle ways, significantly different procedures may be required. Accordingly, it may be difficult to ensure consistent compliance with regulatory and other requirements relating to such file transfers when different file transfer tools 120 are used. As a result, the procedure for transferring a file in system 100, even when file transfer tool 120A and file transfer tool 120B are used, may be operationally cumbersome, inefficient, and difficult to perform consistently.

Also, some of the tasks involved in such a file transfer may require a high level of authentication in order to be performed, so in many cases, such tasks might only be arranged or performed by a small subset of users, such as network administrators. In scenarios in which the number of sufficiently-privileged administrators are limited, a potential bottleneck for file transfer may result. Further, when such operations are performed in response to user input, even from an administrator, a malicious act or even an innocent mistake may result in data loss, a security breach, business disruption, or other detrimental event. Accordingly, file transfers performed by any of file transfer tools 120, even if done under the direction of an administrator or in response to administrator input, may expose enterprise network 101 to a significant amount of operational risk.

In the example of FIG. 1, and in accordance with one or more aspects of the present disclosure, computing system 140 may provide file transfer services. In some examples, system 140 may serve as a system that abstracts at least some of the details underlying performance of a file transfer. Computing system 140 may further perform, schedule, or arrange or cause the performance or scheduling of various supplemental tasks associated with the file transfer, such as supplemental tasks relating to provisioning and sustainment of the connection or data path.

In FIG. 1, computing system 140 may receive a request to transfer a specific file. For instance, with reference to FIG. 1, client computing system 110 outputs a signal over network 102. Computing system 140 detects a signal and determines that the signal corresponds to a request to transfer a file. Computing system 140 outputs a signal over network 102. Client computing system 110 detects a signal over network 102 and determines that the signal includes information sufficient to present a user interface. Client computing system 110 presents user interface 302 at a display associated with client computing system 110. Client computing system 110 detects input and outputs a signal over network 102. Computing system 140 detects a signal over network 102 and determines that the signal corresponds to information relating to a request, submitted by a user of client computing system 110 in response to user interface 302, to transfer file 191C to computing system 150C.

Computing system 140 may identify a file transfer tool and related tasks associated with performing a file transfer. For instance, in the example of FIG. 1, computing system 140 analyzes the capabilities of one or more file transfer tools 120 available within enterprise network 101. Computing system 140 determines, based on the source and nature of the file, that file transfer tool 120A is an appropriate file transfer tool for performing the requested file transfer involving file 191C. Computing system 140 further identifies additional tasks relating to the file transfer that should or must be performed by file transfer tool 120A and/or other systems within enterprise network 101. Such tasks may involve provisioning a data path or channel between external computing system 190C and computing system 150C. Such tasks may further involve scheduling and/or performing appropriate sustainment operations relating to the data path or channel, once established. In some examples, sustainment operations may further include various lifecycle management operations associated with the data path or channel.

Computing system 140 may cause file transfer tool 120A to provision a connection or data path for transferring file 191C. Computing system 140 outputs one or more signals over network 102. File transfer tool 120A detects a signal and determines that the signal corresponds to one or more commands to provision or establish a data path or channel for transferring file 191C from external computing system 190C to computing system 150C. For example, file transfer tool 120A may, based on the commands, select and/or configure the file transfer platform to be used, and perform firewall, operating system, and other network configurations. Provisioning a data path may also involve performing other tasks relating to transmission onboarding, such as tasks relating to reporting, privacy preservation, recordkeeping, security practices, transparency and visibility, audit trail creation, firewall configuration, operating system configuration, data preservation, and others. In some cases, various compliance and/or regulatory concerns may require some or all of such tasks to be performed in connection with provisioning a data path for transferring a file.

Computing system 140 may cause file transfer tool 120A to transfer the file. Once a data path between external computing system 190C and computing system 150C has been provisioned, computing system 140 interacts, perhaps in response to further input or signals from client computing system 110, with file transfer tool 120A to cause file transfer tool 120A to perform the file transfer. In some examples, computing system 140 issues commands to file transfer tool 120A through an API (application programming interface) exposed by file transfer tool 120A. In other examples, such commands may be provided through a different type of interface or may correspond to a native command issued to file transfer tool 120A in order to perform the desired operations. In response to receiving the commands, file transfer tool 120A executes the commands to perform the file transfer.

Computing system 140 may cause file transfer tool 120A to perform sustainment and/or lifecycle management tasks. Computing system 140 may output one or more additional signals over network 102. File transfer tool 120A may determine that the signals received from computing system 140 (and/or earlier signals received from computing system 140) include information and/or commands relating to performing a number of sustainment tasks. In other words, file transfer tool 120A may also perform tasks relating to a provisioned data path or channel that not only will allow file 191C to be transferred, but that may allow additional files to be transferred between external computing system 190C and computing system 150C in the future. In some examples, such sustainment tasks may include tasks relating to the maintenance of the data path, tasks relating to ensuring that compliance with regulatory and/or corporate or organizational policies and/or applicable regulations is maintained, tasks relating to reporting or audit-trail creation, tasks relating to monitoring and/or testing of the data path, performance metrics collection, performance monitoring, and tasks relating to data preservation, scheduling, visibility operations, and others.

In some examples, sustainment tasks may further include one or more lifecycle management tasks. Lifecycle management tasks may involve cleanup of stale data paths, compliance checking, removing or disabling unused accounts, security certificate monitoring and renewal. In general, lifecycle management tasks may include sustainment tasks that might not involve day to day attention, but that might otherwise be needed to ensure that a data path configuration does not otherwise go stale through lack of use, or if it does, various lifecycle tasks might ensure that such a data path is properly cleaned up and removed. File transfer tool 120A may, in response to signals received from computing system 140, perform and/or schedule some or all of the sustainment tasks. In some examples, performing and/or scheduling the sustainment tasks may include performing and/or scheduling the lifecycle management tasks (e.g., occasionally or periodically) so that they are also performed at an appropriate time.

In the example just described, a user of client computing system 110 specifies the source file and the destination, and computing system 140 performs interactions with one or more of file transfer tools 120 and any associated systems within enterprise network 101 and/or system 100. Accordingly, computing system 140 may serve as an abstraction layer for one or more file transfer tools 120. As a result, a user of client computing system 110 need not have the detailed knowledge that may otherwise be required when interacting with each of file transfer tools 120 directly, and less input may be required of the user of client computing system 110. Further, computing system 140 attends to details for configuring one or more of file transfer tools 120 to provision a data path or channel, perform and/or schedule related operations associated with sustainment and/or lifecycle management, and perform the file transfer. Accordingly, such operations may be performed under machine control (e.g., by computing system 140). By performing such operations under machine control, they need not be performed at the direction of a privileged user (i.e., administrator) of enterprise network 101 or a user operating client computing system 110. Accordingly, there is less operational risk associated with such operations, since sources of human error are mitigated or eliminated. Therefore, aspects of this disclosure may improve the function of system 100 and/or enterprise network 101 because providing an abstraction layer for one or more file transfer tools may have the effect of causing system 100 and/or enterprise network 101 to operate more reliably, more consistently, with less susceptibility to human error, and with less exposure to operational risk.

FIG. 1 illustrates one example implementation of system 100. Although examples may be described herein in terms of file transfers involving an enterprise network, techniques described herein may apply to other types of network operations, and the scope of this disclosure is not necessarily limited to the type of file transfers described herein. Accordingly, other example or alternative implementations of system 100 may be appropriate in other instances. Such implementations may include a subset of the devices and/or components included in the example of FIG. 1 and/or may include additional devices and/or components not shown in FIG. 1. Therefore, although one or more implementations of system 100 may be described with reference to FIG. 1, system 100 may be implemented in a number of different ways.

For instance, one or more devices of system 100 that may be illustrated as separate devices may alternatively be implemented as a single device; one or more components of system 100 that may be illustrated as separate components may alternatively be implemented as a single component. Also, in some examples, one or more devices of system 100 that may be illustrated as a single device may alternatively be implemented as multiple devices; one or more components of system 100 that may be illustrated as a single component may alternatively be implemented as multiple components. Each of the multiple devices and/or components may be directly coupled via wired or wireless communication and/or remotely coupled via one or more networks. Also, one or more devices or components that may be illustrated in FIG. 1 may alternatively be implemented as part of another device or component not shown in FIG. 1.

Further, certain operations, techniques, features, and/or functions may be described herein as being performed by specific components, devices, and/or modules in FIG. 1. In other examples, such operations, techniques, features, and/or functions may be performed by different components, devices, or modules. Accordingly, some operations, techniques, features, and/or functions that may be described herein as being attributed to one or more components, devices, or modules in FIG. 1 may, in other examples, be attributed to other components, devices, and/or modules, even if not specifically described herein in such a manner.

Figure 2:
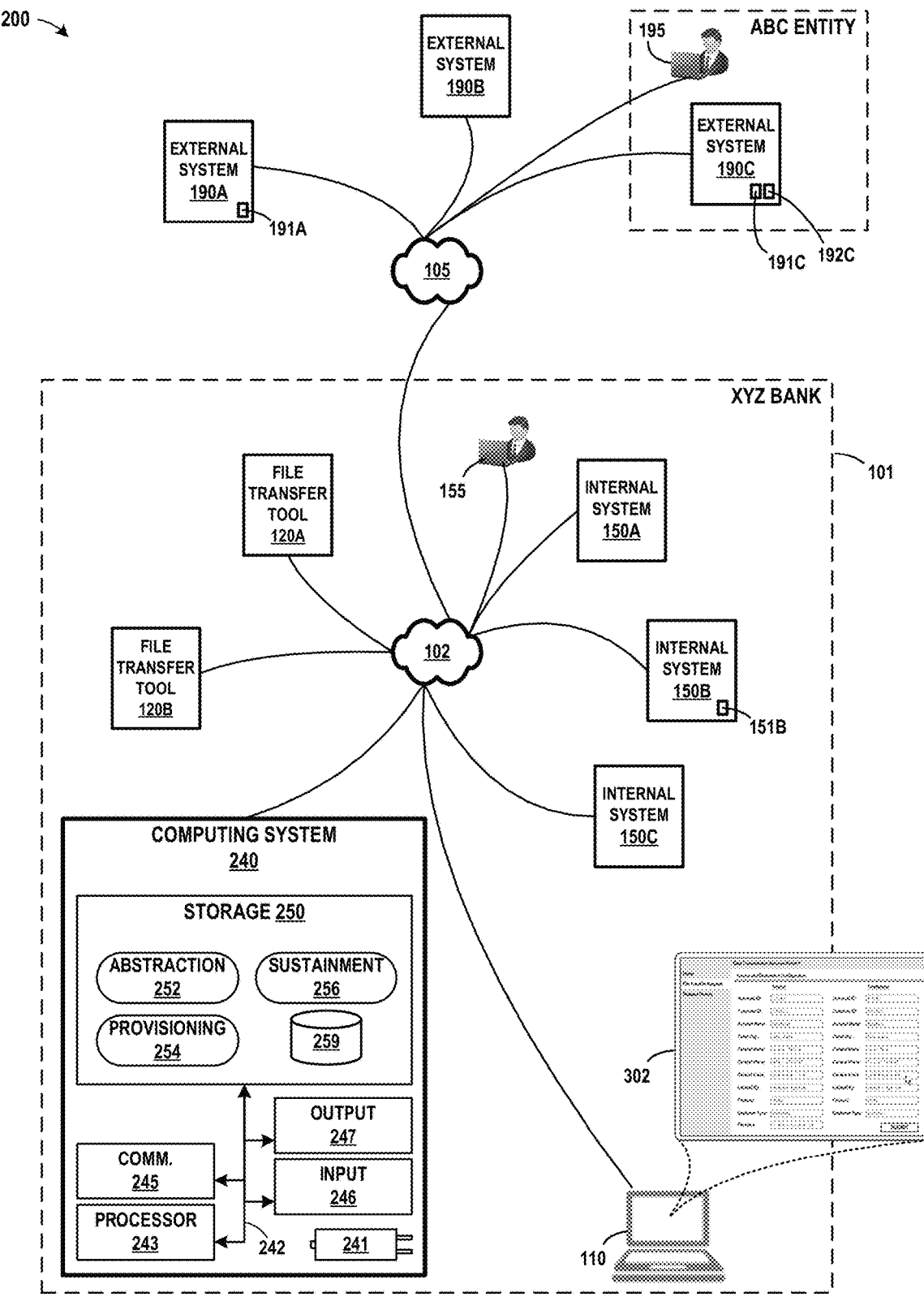
FIG. 2 is a conceptual diagram illustrating an example computing system that provides an abstraction layer for one or more file transfer tools, in accordance with one or more aspects of the present disclosure.

FIG. 2 is a conceptual diagram illustrating an example computing system that provides an abstraction layer for one or more file transfer tools, in accordance with one or more aspects of the present disclosure. System 200 of FIG. 2 may be described as an example or alternative implementation of system 100 of FIG. 1. In the example of FIG. 2, system 200 includes many of the same systems, devices, and/or components shown in system 100 of FIG. 1, and each may correspond to the system, device, and/or component having the same reference numeral used in FIG. 1.

Included within FIG. 2 is a block diagram of computing system 240, which may be an example or alternative implementation of one or more computing systems 140 of FIG. 1. In the example of FIG. 2, computing system 240 may include power source 241, one or more processors 243, one or more communication units 245, one or more input devices 246, one or more output devices 247, and one or more storage devices 250. Storage devices 250 may include abstraction module 252, provisioning module 254, sustainment module 256, and data store 259. One or more of the devices, modules, storage areas, or other components of computing system 240 may be interconnected to enable inter-component communications (physically, communicatively, and/or operatively). In some examples, such connectivity may be provided by through communication channels (e.g., communication channel 242), a system bus, a network connection, an inter-process communication data structure, or any other method for communicating data.

Power source 241 may provide power to one or more components of computing system 240. Power source 241 may receive power from the primary alternating current (AC) power supply in a building, home, or other location. In other examples, power source 241 may be a battery or a device that supplies direct current (DC). In still further examples, computing system 240 and/or power source 241 may receive power from another source. One or more of the devices or components illustrated within computing system 240 may be connected to power source 241, and/or may receive power from power source 241. Power source 241 may have intelligent power management or consumption capabilities, and such features may be controlled, accessed, or adjusted by one or more modules of computing system 240 and/or by one or more processors 243 to intelligently consume, allocate, supply, or otherwise manage power.

One or more processors 243 of computing system 240 may implement functionality and/or execute instructions associated with computing system 240 or associated with one or more modules illustrated herein and/or described below. One or more processors 243 may be, may be part of, and/or may include processing circuitry that performs operations in accordance with one or more aspects of the present disclosure. Examples of processors 243 include microprocessors, application processors, display controllers, auxiliary processors, one or more sensor hubs, and any other hardware configured to function as a processor, a processing unit, or a processing device. Central monitoring system 210 may use one or more processors 243 to perform operations in accordance with one or more aspects of the present disclosure using software, hardware, firmware, or a mixture of hardware, software, and firmware residing in and/or executing at computing system 240.

One or more communication units 245 of computing system 240 may communicate with devices external to computing system 240 by transmitting and/or receiving data, and may operate, in some respects, as both an input device and an output device. In some examples, communication unit 245 may communicate with other devices over a network. In other examples, communication units 245 may send and/or receive radio signals on a radio network such as a cellular radio network. In other examples, communication units 245 of computing system 240 may transmit and/or receive satellite signals on a satellite network such as a Global Positioning System (GPS) network. Examples of communication units 245 include a network interface card (e.g. such as an Ethernet card), an optical transceiver, a radio frequency transceiver, a GPS receiver, or any other type of device that can send and/or receive information. Other examples of communication units 245 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input devices 246 may represent any input devices of computing system 240 not otherwise described herein. One or more input devices 246 may generate, receive, and/or process input from any type of device capable of detecting input from a human or machine. For example, one or more input devices 246 may generate, receive, and/or process input in the form of electrical, physical, audio, image, and/or visual input (e.g., peripheral device, keyboard, microphone, camera).

One or more output devices 247 may represent any output devices of computing system 240 not otherwise described herein. One or more output devices 247 may generate, receive, and/or process input from any type of device capable of detecting input from a human or machine. For example, one or more output devices 247 may generate, receive, and/or process output in the form of electrical and/or physical output (e.g., peripheral device, actuator).

One or more storage devices 250 within computing system 240 may store information for processing during operation of computing system 240. Storage devices 250 may store program instructions and/or data associated with one or more of the modules described in accordance with one or more aspects of this disclosure. One or more processors 243 and one or more storage devices 250 may provide an operating environment or platform for such modules, which may be implemented as software, but may in some examples include any combination of hardware, firmware, and software. One or more processors 243 may execute instructions and one or more storage devices 250 may store instructions and/or data of one or more modules. The combination of processors 243 and storage devices 250 may retrieve, store, and/or execute the instructions and/or data of one or more applications, modules, or software. Processors 243 and/or storage devices 250 may also be operably coupled to one or more other software and/or hardware components, including, but not limited to, one or more of the components of computing system 240 and/or one or more devices or systems illustrated as being connected to computing system 240.

In some examples, one or more storage devices 250 are temporary memories, meaning that a primary purpose of the one or more storage devices is not long-term storage. Storage devices 250 of computing system 240 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 250, in some examples, also include one or more computer-readable storage media. Storage devices 250 may be configured to store larger amounts of information than volatile memory. Storage devices 250 may further be configured for long-term storage of information as non-volatile memory space and retain information after activate/off cycles. Examples of non-volatile memories include magnetic hard disks, optical discs, Flash memories, or forms of electrically programmable memories (EPROM) or electrically erasable and programmable (EEPROM) memories.

Abstraction module 252 may perform functions relating to providing an abstraction layer for one or more file transfer tools and/or providing a unified front-end interface for one or more file transfer tools (e.g., managed file transfer systems). Abstraction module 252 may perform file transfer services relating to requests that abstraction module 252 of computing system 240 receives from one or more client computers (e.g., client computing system 110) within enterprise network 101. Abstraction module 252 may receive information that abstraction module 252 determines includes information about a file transfer, and may, in response, identify an appropriate method for performing the transfer. Abstraction module 252 may perform an analysis of information to identify an appropriate channel or set of channels for performing a requested file transfer. Abstraction module 252 may interact with provisioning module 254 to provision an appropriate channel or data path. Abstraction module 252 may also interact with one or more file transfer tools 120, through an API or otherwise, to cause one or more file transfer tools 120 to perform file transfer functions on behalf of a user of client computing system 110. Abstraction module 252 may access data store 259 and determine that a connection for a file transfer has already been established. Abstraction module 252 may also determine that the already-established data path has been properly maintained. Abstraction module 252 may receive information from and output information to one or more other modules, and may otherwise interact with and/or operate in conjunction with one or more other modules of computing system 240.

Provisioning module 254 may perform functions relating to establishing a channel or data path between two computing systems that may be on the same network or may be on different networks. Provisioning module 254 may determine appropriate protocols and technologies for performing the file transfer. Provisioning module 254 may identify one or more file transfer systems that may be appropriate for performing the file transfer. Provisioning module 254 may provision a data path or channel between two computing systems by interacting with one or more file transfer tools 120, through an API or otherwise, to establish a data path. Provisioning module 254 may also identify any related tasks that are to be performed in the data path with the specified file transfer. Provisioning module 254 may store, within data store 259, information relating to a provisioned data path.

Sustainment module 256 may perform functions relating to performing tasks to maintain or ensure one or more data paths or channels between computing systems within system 200 may be reused. In some examples, such tasks may involve reporting, testing, monitoring, security, maintenance, and other activities. In some examples, such tasks may include lifecycle management tasks, which may also ensure that previously-established data paths may be reused for later file transfers, or that unused data paths are removed or appropriately cleaned up. Sustainment module 256 identifies commands that, when issued to file transfer tool 120A, will cause the appropriate lifecycle management tasks to be performed or scheduled to be performed at an appropriate time.

Data store 259 may represent any suitable data structure or storage medium for storing information related to channel information and/or information relating to file transfers performed between computing systems on a network. The information stored in data store 259 may be searchable and/or categorized such that one or more modules within computing system 240 may provide an input requesting information from data store 259, and in response to the input, receive information stored within data store 259. Data store 259 may be primarily maintained by provisioning module 254. Data store 259 may store channel information, and information about the data path, such as security certificates, protocols used, and other information. Data store 259 may receive from provisioning module 254 information about a newly established data path. Data store 259 may provide other modules with access to the data stored within data store 259, and/or may analyze the data stored within data store 259 and output such information on behalf of other modules of computing system 240.

Modules illustrated in FIG. 2 (e.g., abstraction module 252, provisioning module 254, sustainment module 256) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

FIG. 2 illustrates one example implementation of system 200. Other example or alternative implementations of system 200 may be appropriate in other instances. Such implementations may include a subset of the devices and/or components included in the example of FIG. 2 and/or may include additional devices and/or components not shown in FIG. 2. Accordingly, although one or more implementations of system 200 of FIG. 2 are described, system 200 may be implemented in a number of other ways.

For instance, one or more devices of system 200 that are illustrated as separate devices may be implemented as a single device; one or more components of system 200 that are illustrated as separate components may be implemented as a single component. Also, in some examples, one or more devices of system 200 that are illustrated as a single device may be implemented as multiple devices; one or more components of system 200 that are illustrated as a single component may be implemented as multiple components. Each of the multiple devices and/or components may be directly coupled via wired or wireless communication and/or remotely coupled via one or more networks. Also, one or more devices or components illustrated in FIG. 2 may also be implemented as part of another device or component not shown in FIG. 2. In this and other ways, some of the functions described herein may be performed via distributed processing by two or more devices.

Further, certain operations, techniques, features, and/or functions are described herein as being performed by specific components, devices, and/or modules in FIG. 2. In other examples, such operations, techniques, features, and/ or functions may be performed by different components, devices, or modules. Accordingly, some operations, techniques, features, and/or functions described herein as being attributed to one or more components, devices, or modules in FIG. 2 may, in other examples, be attributed to other components, devices, and/or modules, even if not specifically described herein in such a manner.

FIG. 3 is a conceptual diagram illustrating an example user interface, presented by a client computing device, for initiating a file transfer in accordance with one or more aspects of the present disclosure. User interface 302, shown presented within client display 111 of FIG. 3, may correspond to a user interface presented by client computing system 110 of FIG. 1 and/or FIG. 2. Although user interface 302 is shown as a graphical user interface, other types of interfaces may be presented in other examples, including a text-based user interface, a console or command-based user interface, a voice prompt user interface, or any other appropriate user interface.

Client computing system 110 may present user interface 302 when input for a file transfer is being solicited from a user of client computing system 110. For instance, in an example that can be described with reference to FIG. 2 and FIG. 3, client computing system 110 detects input and outputs a signal over network 102. Communication unit 245 of computing system 240 detects a signal over network 102 and outputs to abstraction module 252 an indication of the signal. Abstraction module 252 determines that the signal originated from client computing system 110. Abstraction module 252 causes communication unit 245 to output a responsive signal over network 102. Client computing system 110 detects the responsive signal and determines that the signal includes information sufficient to generate a user interface. Client computing system 110 generates user interface 302 and presents user interface 302 at client display 111 as illustrated in FIG. 3.

In FIG. 3, user interface 302 illustrates various source fields 310 and destination fields 320 relating to a proposed file transfer being requested by a user of client computing system 110. Each of source fields 310 and destination fields 320 request information used to provision or establish a data path for transferring a file between one computing system and another. In the example shown, source fields 310 and destination fields 320 include parallel or near-parallel fields corresponding to information about the source and destination of the file transfer. The file to be transferred may be identified in filename field 311.

In some examples, information requested in user interface 302 may be collected before a first file transfer between the source and destination computing systems, and once a data path is established, some or all of the information requested in user interface 302 of FIG. 3 might not be requested again. Instead, in some examples, later transfers may require the name of the file being transferred, but other information may be deduced, reused, or otherwise determined from information established during the first transfer.

Computing system 240 may use the information collected by user interface 302 to identify a requested file transfer. For instance, referring again to the examples of FIG. 2 and FIG. 3, client computing system 110 detects input and outputs a signal over network 102. Communication unit 245 of computing system 240 detects a signal over network 102 and outputs to abstraction module 252 an indication of the signal. Abstraction module 252 determines that the signal includes information about transferring a file between two computing systems within system 200. In some examples, abstraction module 252 determines that a user of client computing system 110 has selected button 330 of user interface 302 after completing the requested information in response to prompts presented in user interface 302. Abstraction module 252 further determines that the signal corresponds to a request to transfer file 191C from external computing system 190C (controlled by ABC Entity) to computing system 150C within enterprise network 101 associated with XYZ Bank.

Computing system 240 may provision a data path between ABC Entity and XYZ Bank, and in particular, between external computing system 190C and computing system 150C. For instance, referring again to FIG. 2, abstraction module 252 outputs to provisioning module 254 information about the signal. Provisioning module 254 determines that the signal includes information about the requested transfer, including some or all of the information illustrated within user interface 302 of FIG. 3. Provisioning module 254 performs an analysis of the information, and identifies an appropriate data path, channel, set of channels, or set of technologies for performing the requested file transfer. Provisioning module 254 determines what appropriate protocols and technologies are available for performing the file transfer. Provisioning module 254 identifies file transfer tool 120A as at least one of file transfer tools 120 that will be used to perform the file transfer.

Provisioning module 254 also identifies any related tasks that are to be performed in connection with the specified file transfer. For example, such related tasks may include tasks mandated by compliance and/or regulatory requirements associated with a file transfer performed by XYZ Bank. Such related tasks may also include tasks that are specified by corporate policies maintained by XYZ Bank or third party agreements held by XYZ Bank. Provisioning module 254 may also perform other tasks relating to transmission onboarding, such as tasks relating to reporting, privacy preservation, recordkeeping, security practices, transparency and visibility, audit trail creation, transmission onboarding, firewall configuration, operating system configuration, audit trail creation, and data preservation. Provisioning module 254 stores, within data store 259, information relating to provisioning the data path between external computing system 190C and computing system 150C. In some cases, various compliance and/or regulatory concerns may require some or all of such tasks to be performed in connection with provisioning a data path for transferring a file.

In some examples, computing system 240 may, when provisioning the data path between external computing system 190C and computing system 150C, require input from an administrator of enterprise network 101. For instance, with reference to FIG. 2, provisioning module 254 outputs one or more signals over network 102. Workstation 155 detects one or more signals over network 102 and determines that the signals include information sufficient to present a user interface. Workstation 155 presents a user interface, prompting for information an administrator monitoring workstation 155. Workstation 155 detects input and outputs a signal over network 102. Communication unit 245 of computing system 240 detects a signal over network 102 and outputs an indication of a signal to provisioning module 254. Provisioning module 254 determines that the signal includes information, responsive to the prompt presented at workstation 155, relating to provisioning a data path between external computing system 190C and computing system 150C. In some examples, such information may include information from an administrator indicating that the data path and/or file transfer has been approved and has been confirmed as being properly established. Provisioning module 254 uses and/or stores the information (e.g., within data store 259) when configuring the data path between external computing system 190C and computing system 150C.

In some examples, computing system 240 may also require, when provisioning the data path between external computing system 190C and computing system 150C, input from an agent or an administrator of external computing system 190C. For instance, again with reference to FIG. 2, provisioning module 254 outputs one or more signals over network 102 and then network 105. Workstation 195 detects one or more signals over network 105 and determines that the signals include information sufficient to present a user interface. Workstation 195 presents a user interface, prompting for information an administrator or agent of ABC Entity that may be monitoring workstation 195. In one example, such a procedure might involve provisioning module 254 causing an email to be directed to a user of workstation 195 that includes a link; when a user of workstation 195 selects the link, workstation 195 presents a user interface. Workstation 195 detects input and outputs a signal over network 105 and then network 102. Communication unit 245 of computing system 240 detects a signal over network 102 and outputs an indication of a signal to provisioning module 254. Provisioning module 254 determines that the signal includes information, from an agent of ABC Entity, relating to provisioning the data path between external computing system 190C and computing system 150C. In some examples, such information may include information from an administrator of ABC Entity indicating that he or she has granted authorization to enable file transfers between external computing system 190C and XYZ Bank, and may, in some examples, authorize the specific requested transfer of file 191C. Provisioning module 254 uses and/or stores the information (e.g., within data store 259) when configuring the data path between external computing system 190C and computing system 150C.

Computing system 240 may cause file 191C to be transferred. For instance, still referring to FIG. 2, provisioning module 254 outputs to abstraction module 252 commands that, when issued to file transfer tool 120A, may cause or enable the requested file transfer to take place. Abstraction module 252 causes communication unit 245 to output a signal over network 102. File transfer tool 120A detects a signal and determines that the signal corresponds to a command for performing a file transfer. In response, file transfer tool 120A transfers file 191C from external computing system 190C to computing system 150C.

Computing system 240 may also perform or schedule any sustainment tasks relating to the transfer of file 191C from external computing system 190C to computing system 150C. For instance, abstraction module 252 outputs to sustainment module 256 information about file 192C. Sustainment module 256 identifies appropriate data path sustainment tasks, which may relate to reporting, organizational compliance, regulatory compliance, testing, monitoring, security, maintenance, audit trail creation, performance monitoring or metrics collection, data preservation, visibility, lifecycle management, and other activities to be performed on the data path established between external computing system 190C and computing system 150C to help ensure that the data path may be reused. In some examples, sustainment tasks may further include one or more lifecycle management tasks that may include scheduled procedures for cleanup or disposal of the data paths if it is not often used (e.g., it becomes "stale"), compliance checking, and/or security certificate monitoring and renewal.

Sustainment module 256 identifies commands that, when issued to file transfer tool 120A, will cause the appropriate sustainment management tasks to be performed at an appropriate time. Sustainment module 256 causes communication unit 245 to output signals over network 102. File transfer tool 120A detects signals over network 102 and determines that the signals include commands relating to sustainment tasks. File transfer tool 120A schedules and/or performs some or all of the sustainment tasks. In some examples, such sustainment tasks may include lifecycle management tasks.

Computing system 240 may identify an already-established data path that may be reused for a later file transfer. For instance, referring again to FIG. 2, and minutes, days, weeks, and/or months after file 191C was transferred from external computing system 190C to computing system 150C, client computing system 110 (or another client computing system) detects input. In response to the input, client computing system 110 outputs a signal over network 102. Communication unit 245 of computing system 240 detects a signal and outputs to abstraction module 252 an indication of the signal. Abstraction module 252 determines that the signal corresponds to an indication that a user of client computing system 110 seeks to transfer file 192C from external computing system 190C (ABC Entity) to computing system 150C (XYZ Bank). Abstraction module 252 accesses data store 259 and determines that a data path and/or channel between 190C and computing system 150C was previously provisioned. Abstraction module 252 also determines that the already-established channel has been properly maintained (e.g., it has complied with regulatory or other requirements, it is secure, any authentication certificates have been properly maintained or renewed, and other sustainment tasks have been appropriately performed).

Computing system 240 may perform a file transfer using the already-established data path. For instance, continuing with the example described in connection with FIG. 2, abstraction module 252 accesses, in data store 259, instructions for performing a file transfer between external computing system 190C and computing system 150C. In some examples, the instructions were previously prepared when the earlier transfer of file 191C from external computing system 190C to computing system 150C was performed. In other examples, some or all of the instructions for performing the file transfer are newly generated by abstraction module 252. Abstraction module 252 causes communication unit 245 to output a signal over network 102. File transfer tool 120A detects a signal and determines that the signal corresponds to instructions for performing a file transfer. File transfer tool 120A executes the instructions, thereby transferring file 192C from external computing system 190C to computing system 150C. File transfer tool 120A outputs a signal over network 102. Communication unit 245 of computing system 240 detects a signal and outputs to abstraction module 252 information about the signal. Abstraction module 252 determines that the signal corresponds to confirmation that the file transfer has been or will be completed. Abstraction module 252 causes a signal to be output over network 102. Client computing system 110 detects a signal and determines that the signal includes information sufficient to generate a user interface. Client computing system 110 presents a user interface at a display (e.g., client display 111) associated with client computing system 110, thereby informing a user of client computing system 110 that the file transfer has been performed.

Sustainment module 256 may thereafter continue to perform various sustainment tasks relating to the data path between external computing system 190C and 150C. For example, sustainment module 256 may interact with file transfer tool 120A over network 102 to perform sustainment tasks, such as those previously scheduled or configured when the data path was originally provisioned. In some examples, such tasks are performed without requiring further input from a user of client computing system 110, thereby further abstracting or shielding a user of client computing system 110 from having to maintain, or have knowledge about how to maintain, the connection, channel, or data path between external computing system 190C and computing system 150C.

In the example described, a user of client computing system 110 requests a file transfer involving file 192C. The user of client computing system 110 may be the same user that requested the earlier file transfer involving file 191C. In other examples, the user of client computing system 110 may be a different user. Further, although the example describes the request to transfer file 192C as originating from client computing system 110, in other examples, the request to transfer file 192C may originate from a different client computing system (not shown).

Figure 4:
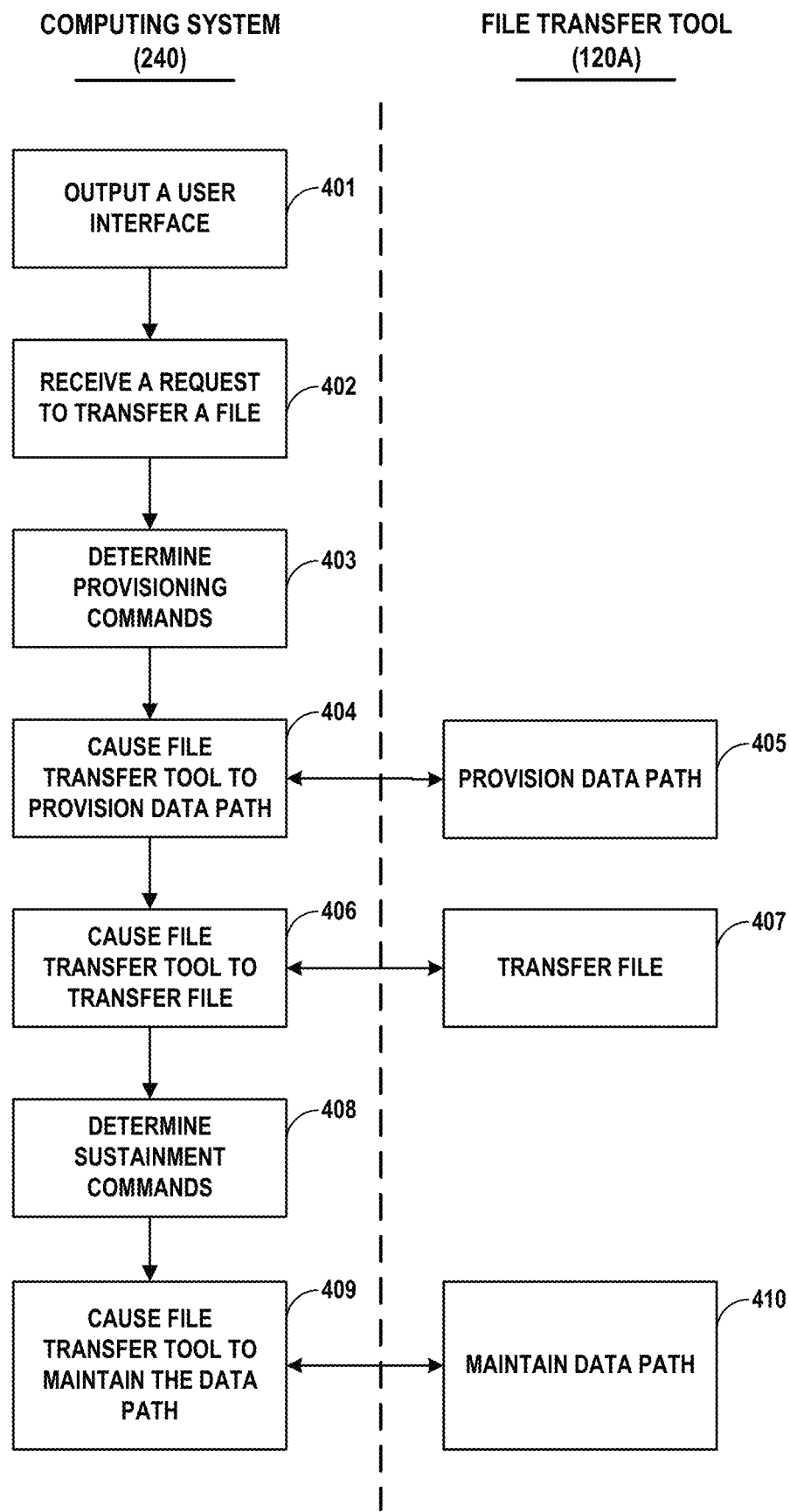
FIG. 4 is a flow diagram illustrating an example process for performing file transfer tasks in accordance with one or more aspects of the present disclosure.

FIG. 4 is a flow diagram illustrating an example process for performing file transfer tasks in accordance with one or more aspects of the present disclosure. The process of FIG. 4 is illustrated from two different perspectives: operations performed by an example computing system 240 (left-hand column to the left of dashed line), and operations performed by an example file transfer tool 120A (right-hand column to the right of dashed line). In the example of FIG. 4, the illustrated process may be performed by system 200 in the context illustrated in FIG. 2. In other examples, different operations may be performed, or operations described in FIG. 4 as being performed by a particular component, module, system, and/or device may be performed by one or more other components, modules, systems, and/or devices. Further, in other examples, operations described in connection with FIG. 4 may be performed in a difference sequence, merged, or omitted, even where such operations are shown performed by more than one component, module, system, and/or device.

In the example of FIG. 4, and in accordance with one or more aspects of the present disclosure, computing system 240 may output a user interface (401). For instance, in some examples, abstraction module 252 may cause communication unit 245 to output a signal over network 102. Client computing system 110 may detect a signal over network 102 and determine that the signal includes information sufficient to present a user interface. Client computing system 110 presents a user interface (e.g., user interface 302) at a display associated with client computing system 110. In some examples, the user interface may be a unified or uniform user interface that does not depend on the manner in which a file will be transferred on network 102. In other words, the user interface may be the same for a number of different types of file transfers, so that a user of client computing system 110 does not need to know many of the details underlying the tools, technologies, file transfer tools 120, and/or systems that will perform the transfer.

Computing system 240 may receive a request to transfer a file (402). For instance, in some examples, communication unit 245 of computing system 240 detects a signal over network 102. Communication unit 245 outputs to abstraction module 252 an indication of the signal. Abstraction module 252 determines that the signal corresponds to a request, from a user of client computing system 110, to perform a file transfer. Abstraction module 252 further determines that the signal includes a request to transfer file 191C from external computing system 190C to computing system 150C.

Computing system 240 may determine provisioning commands (403). For instance, in some examples, abstraction module 252 accesses data store 259 and determines whether a data path between external computing system 190C and computing system 150C has been previously provisioned. If so, abstraction module 252 evaluates the previously-provisioned data path to determine whether it has been properly maintained. If the data path has been properly maintained, abstraction module 252 accesses, within data store 259, information about the data path. If a data path has not been established, or if a previously-established data path has not been properly maintained, abstraction module 252 outputs to provisioning module 254 information about the request. Provisioning module 254 identifies, or uses information from abstraction module 252 to identify, file transfer tool 120A as an appropriate tool for performing the file transfer. Based on the identified file transfer tool (i.e., file transfer tool 120A), provisioning module 254 generates commands that, when issued to file transfer tool 120A, will provision a data path.

Computing system 240 may cause file transfer tool 120A to provision the data path (404). For instance, in some examples, provisioning module 254 causes communication unit 245 to output a signal over network 102. File transfer tool 120A detects a signal over network 102 and determines that the signal includes commands or instructions for establishing a data path or channel between external computing system 190C and computing system 150C. File transfer tool 120A executes the instructions and thereby establishes a data path (405). File transfer tool 120A may further interact with computing system 240 over network 102. Provisioning module 254 of computing system 240 stores, within data store 259, information about the data path.

Computing system 240 may cause file transfer tool 120A to perform the file transfer (406) or may enable the capability of the file transfer to take place. For instance, in some examples, abstraction module 252 causes communication unit 245 to output a signal over network 102. File transfer tool 120A detects a signal over network 102 and determines that the signal includes one or more commands or instructions. File transfer tool 120A executes the instructions at the direction of computing system 240, thereby transferring file 191C from external computing system 190C to computing system 150C (407). File transfer tool 120A further interacts with computing system 240 over network 102. Communication unit 245 outputs to abstraction module 252 an indication of a signal, received over network 102, that abstraction module 252 determines corresponds to an indication that the file transfer has been completed.

Computing system 240 may determine sustainment commands (408). For instance, in some examples, sustainment module 256 determines, based on the identified file transfer tool (i.e., file transfer tool 120A), one or more commands for maintaining the provisioned data path. In some examples, such commands may help ensure that the data path may be used in the future to perform additional file transfers. Further, in some examples, the commands are selected to cause file transfer tool 120A to perform, or to schedule performance of, one or more sustainment and/or lifecycle operations.

Computing system 240 may cause file transfer tool 120A to maintain the data path (409). For instance, in some examples, sustainment module 256 causes communication unit 245 to output a signal over network 102. File transfer tool 120A detects a signal over network 102 and determines that the signal corresponds to one or more commands. File transfer tool 120A performs or schedules the execution of the commands at the direction of computing system 240, and thereby performs or schedules sustainment or maintenance tasks for the data path provisioned between external computing system 190C and computing system 150C (410). File transfer tool 120A may further interact with computing system 240 over network 102. Communication unit 245 outputs to sustainment module 256 an indication of a signal that sustainment module 256 determines corresponds to an indication that one or more sustainment and/or lifecycle maintenance tasks have been performed and/or scheduled.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/ or firmware.

What is claimed is:

1. A method comprising:
    outputting, by a computing system, a unified user interface for transferring files on a network using at least one of a plurality of file transfer tools, wherein the unified user interface includes prompts for information sufficient to transfer files using the at least one of the plurality of file transfer tools;
    receiving, responsive to interactions with the unified user interface, a request to transfer a specified file on the network;
    identifying a file transfer tool appropriate for transferring the specified file;

provisioning, based on identifying the file transfer tool, a data path on the network that the file transfer tool can use to transfer the specified file;

enabling the file transfer tool to transfer the specified file over the data path; and automatically performing sustainment operations for maintaining the data path, wherein automatically performing sustainment operations includes audit-trail creation, regulation compliance checking, and data path testing.

2. The method of claim 1, wherein the specified file is a first file, the method further comprising:

receiving a request to transfer a second file on the network;

determining that the file transfer tool is appropriate for transferring the second file on the network, and that the data path can be used to transfer the second file;

enabling the file transfer tool to transfer the second file over the data path; and continuing to automatically perform, by the computing system, and without requiring further input, the sustainment operations.

3. The method of claim 1, wherein automatically performing sustainment operations further includes at least one of:

data path monitoring, organizational policy compliance checking, data path performance monitoring, and data preservation tasks.

4. The method of claim 1, wherein automatically performing sustainment operations includes:

determining a set of sustainment commands for maintaining the data path; and issuing the sustainment commands to the file transfer tool.

5. The method of claim 1, wherein automatically performing sustainment operations includes:

performing the sustainment operations without requiring further input from a user.

6. The method of claim 1, wherein provisioning the data path includes:

outputting, over the network to a computing device monitored by a network administrator, a prompt for information;

receiving, over the network and from the computing device, information responsive to the prompt; and using the information to provision the data path.

7. The method of claim 1, wherein provisioning the data path includes performing one or more of the following:

transmission onboarding, reporting, privacy preservation tasks, recordkeeping, security practices, transparency practices, visibility practices, audit trail creation, firewall configuration, operating system configuration, and data preservation tasks.

8. The method of claim 7, wherein automatically performing sustainment operations includes:

performing lifecycle management tasks that include one or more of: disposing of resources allocated to a data path that is in a stale condition, authenticity certificate checking, and authenticity certificate renewal.

9. A computing system comprising a storage system and processing circuitry, wherein the processing circuitry has access to the storage system and is configured to:

output a unified user interface for transferring files on a network using at least one of a plurality of file transfer tools, wherein the unified user interface includes prompts for information sufficient to transfer files using the at least one of the plurality of file transfer tools;

receive, responsive to interactions with the unified user interface, a request to transfer a specified file on the network;

identify a file transfer tool appropriate for transferring the specified file;

provision, based on identifying the file transfer tool, a data path on the network that the file transfer tool can use to transfer the specified file;

enable the file transfer tool to transfer the specified file over the data path; and automatically perform sustainment operations for maintaining the data path by performing audit-trail creation, regulation compliance checking, and data path testing.

10. The computing system of claim 9, wherein the specified file is a first file, and wherein the processing circuitry is further configured to:

receive, a request to transfer a second file on the network;

determine that the file transfer tool is appropriate for transferring the second file on the network, and that the data path can be used to transfer the second file;

enable the file transfer tool to transfer the second file over the data path; and continue to automatically perform and without requiring further input, the sustainment operations.

11. The computing system of claim 9, wherein to perform sustainment operations, the processing circuitry is further configured to perform at least one of:

data path monitoring, organizational policy compliance checking, data path performance monitoring, and data preservation tasks.

12. The computing system of claim 9, wherein to perform sustainment operations, the processing circuitry is further configured to:

determine a set of sustainment commands for maintaining the data path; and issue the sustainment commands to the file transfer tool.

13. The computing system of claim 9, wherein to perform sustainment operations, the processing circuitry is further configured to:

perform the sustainment operations without requiring further input from a user.

14. The computing system of claim 9, wherein to provision the data path, the processing circuitry is further configured to:

output, over the network to a computing device monitored by a network administrator, a prompt for information;

receive, over the network and from the computing device, information responsive to the prompt; and use the information to provision the data path.

15. The computing system of claim 9, wherein to provision the data path, the processing circuitry is further configured to perform one or more of the following:

transmission onboarding, reporting, privacy preservation tasks, recordkeeping, security practices, transparency practices, visibility practices, audit trail creation, firewall configuration, operating system configuration, and data preservation tasks.

16. The computing system of claim 15, wherein to perform sustainment operations, the processing circuitry is further configured to:

perform lifecycle management tasks that include one or more of: dispose of resources allocated to a data path that is in a stale condition, perform authenticity certificate checking, and perform authenticity certificate renewal.

17. A non-transitory computer-readable medium comprising instructions that, when executed, configure processing circuitry of a computing system to:
- output a unified user interface for transferring files on a network using at least one of a plurality of file transfer tools, wherein the unified user interface includes prompts for information sufficient to transfer files using at least one of the plurality of file transfer tools;
- receive, responsive to interactions with the unified user interface, a request to transfer a specified file on the network;
- identify a file transfer tool appropriate for transferring the specified file;
- provision, based on identifying the file transfer tool, a data path on the network that the file transfer tool can use to transfer the specified file;
- enable the file transfer tool to transfer the specified file over the data path; and
- automatically perform sustainment operations for maintaining the data path by performing audit-trail creation, regulation compliance checking, and data path testing.

18. The non-transitory computer-readable medium of claim 17, wherein the specified file is a first file, and wherein the instructions further configure the processing circuitry to:
- receive, a request to transfer a second file on the network;
- determine that the file transfer tool is appropriate for transferring the second file on the network, and that the data path can be used to transfer the second file;
- enable the file transfer tool to transfer the second file over the data path; and
- continue to automatically perform and without requiring further input, the sustainment operations.

19. The non-transitory computer-readable medium of claim 17, wherein the instructions further configure the processing circuitry to perform at least one of:
- data path monitoring, organizational policy compliance checking, data path performance monitoring, and data preservation tasks.

20. The non-transitory computer-readable medium of claim 19, wherein the instructions further configure the processing circuitry to:
- determine a set of sustainment commands for maintaining the data path; and
- issue the sustainment commands to the file transfer tool.

* * * * *